United States Patent
Raleigh

[15] 3,664,414
[45] May 23, 1972

[54] FURNACE HAVING MULTIPLE SPEED MOTOR AND ACCESSORY CONTROL SYSTEM

[72] Inventor: William F. Raleigh, Hacienda Heights, Calif.

[73] Assignee: Carrier Corporation, Syracuse, N.Y.

[22] Filed: July 6, 1970

[21] Appl. No.: 60,985

Related U.S. Application Data

[62] Division of Ser. No. 827,223, July 23, 1969.

[52] U.S. Cl. ............................................. 165//26
[51] Int. Cl. ............................................. F25b 29/00
[58] Field of Search ............................................. 165/26, 27

Primary Examiner—Charles Sukalo
Attorney—Harry G. Martin, Jr. and J. Raymond Curtin

[57] ABSTRACT

A heating and cooling system including a furnace having a control module comprising a prewired printed circuit board having a pair of line voltage conductors connected to the primary winding of a power transformer and a pair of low voltage conductors connected to the secondary winding of a power transformer. Terminal means are provided for connecting a plug-in fan relay and a thermostat in the low voltage circuit. Additional terminal means are provided for connecting a fan motor and a humidifier and humidifier relay to the line voltage circuit. Terminal means are also provided in conjunction with a double-pole, double-throw fan motor relay switch for connecting an air cleaner accessory unit to the circuit. The circuit is arranged to provide the desired optimum programing of control functions with any combination of accessories.

2 Claims, 2 Drawing Figures

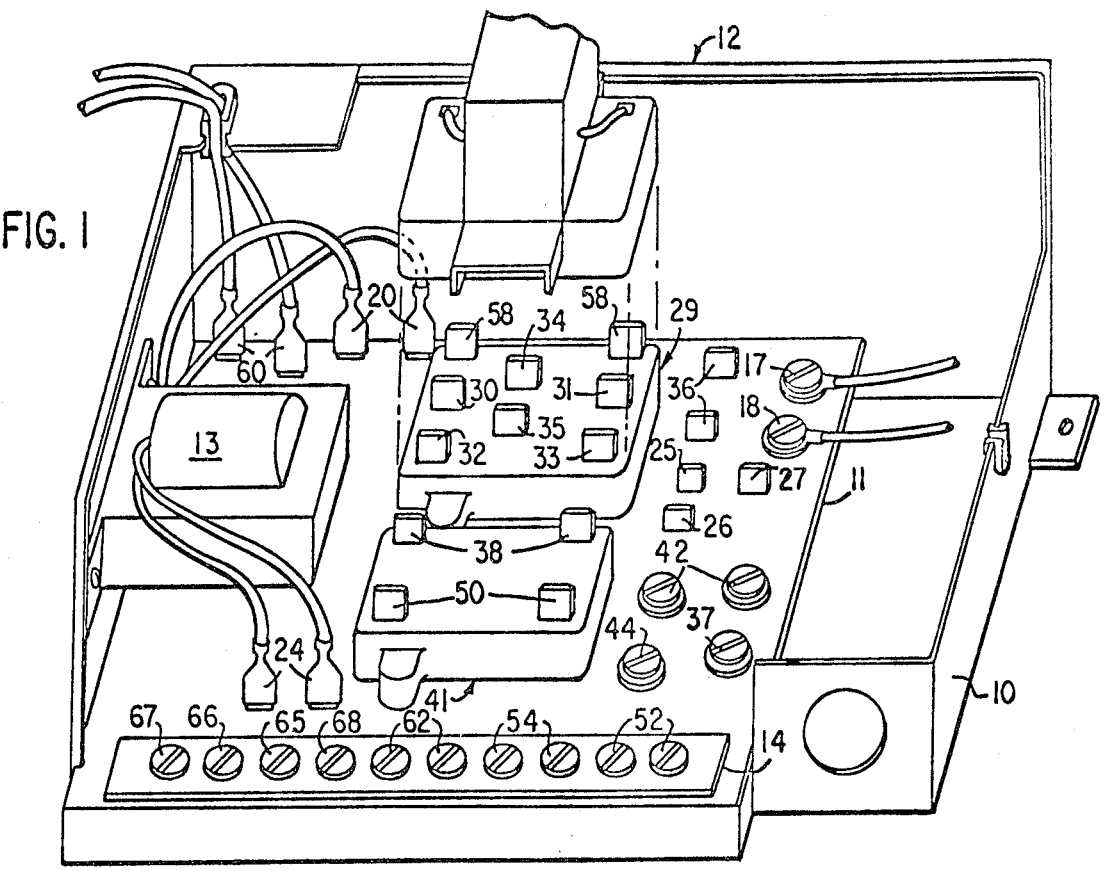
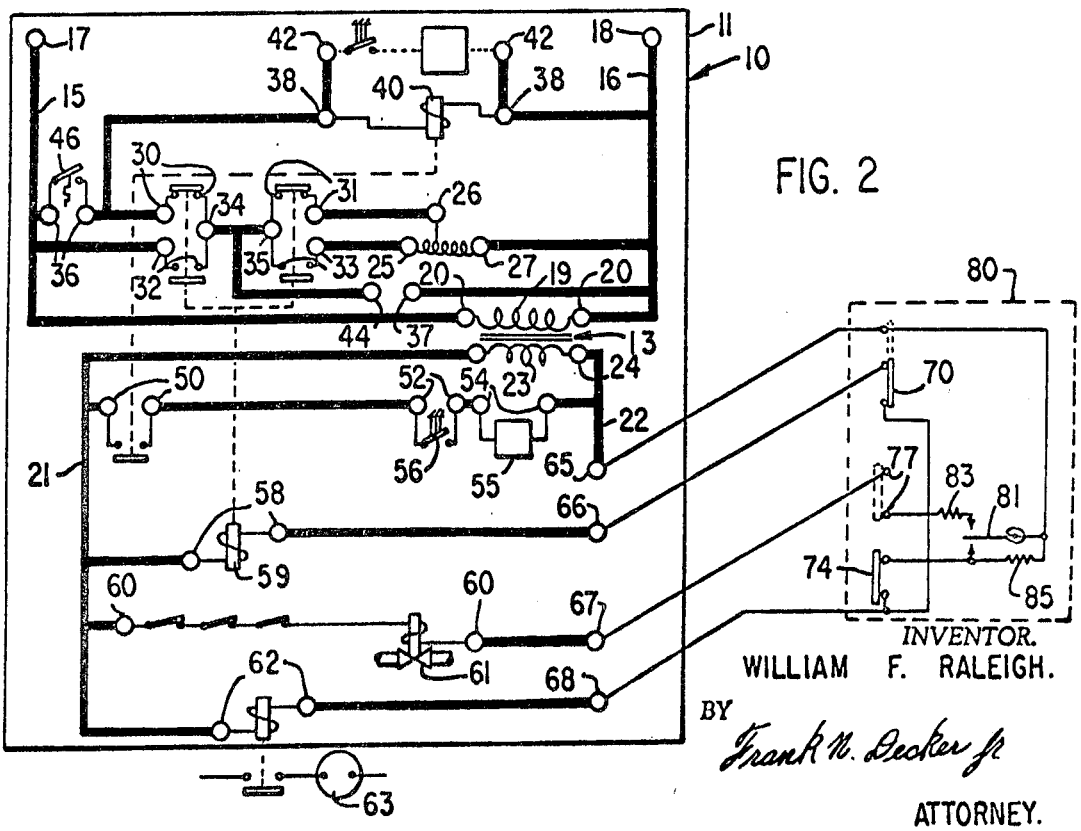

FURNACE HAVING MULTIPLE SPEED MOTOR AND ACCESSORY CONTROL SYSTEM

CROSS REFERENCE TO RELATED APPLICATION

This application is a division of my copending application, Ser. No. 827,223, entitled "FURNACE HAVING MULTIPLE SPEED MOTOR AND ACCESSORY CONTROL SYSTEM" filed May 23, 1969.

BACKGROUND OF THE INVENTION

This invention relates to heating and cooling systems such as furnaces which have provision for air conditioning, humidification and air cleaners. It is often desired to utilize various accessories, such as humidifiers, air cleaners and air cooling units in conjunction with a warm air furnace having a fuel burner under the control of a low voltage thermostat. In order for the furnace and the various accessories which may be used with it to function properly with respect to the operation of the heating controls, it is necessary that the accessory controls be properly programed. For example, it would not be normally desirable to permit the humidifier to operate at the same time that air was being cooled by an air conditioning unit. However, it would be desirable to always operate the air cleaner whether the furnace fan is operating on either high or low speed during either heating or cooling or simply circulating air, and regardless of whether the fan was manually or automatically controlled. On the other hand, neither the humidifier or air cleaner should work when the fan is off. Because of the necessity for properly programing the controls, the wiring of a furnace system may become quite complex, and oftentimes unnecessary components are added to the system, because the installer does not know how to avoid them by utilizing the humidifier function already present in the system. Also, the same furnace may be used with either single speed or multiple speed furnace fans and either with or without air cleaners which further complicates the required wiring. The installer can also wire the system in a variety of ways which may provide only partially satisfactory operation of the various accessories.

The results of the complexities explained have frequently been that the installer has made serious wiring errors resulting in damaged components in the system or a variety of controls have been wired into an arrangement having more than an optimum number of components and cost. Furthermore, the addition of an additional control transformer when using a low voltage humidifier to the furnace control system may result in an incompatible combination and unsatisfactory operation of the humidifier or other accessories.

Another problem which frequently arises is that the control system may function properly as long as all of the components are operating in their intended manner but the failure of one of the components may result in an unsafe mode of operation thereafter. For example, it is desirable to assure that failure of a humidistat will not result in operation of the humidifier except during periods of heating. Likewise, it is desirable that failure of a fan motor relay will not operate the air cleaner unless the fan is operating so that excess ozone is not generated. Further, it is desirable that field installation of an electronic air cleaner be readily made without shorting a multiple speed motor if one is used, while at the same time providing circuitry for a single speed motor system either with or without air conditioning and humidification.

Accordingly, it is a principal feature of this invention to provide a prewired control system for a furnace which is adapted to operate with a minimum number of parts and at the same time provide a properly programed control function for humidifiers having different control voltages and for thermostats and single or multiple speed motors which may be installed with the furnace.

SUMMARY OF THE INVENTION

In accordance with this invention, there is provided a prewired control circuit for a furnace which utilizes an electronic air cleaner accessory unit. A pair of line voltage conductors are connected by suitable terminals to a source of alternating current voltage and to the primary winding of a power transformer. A pair of low voltage conductors are connected to the secondary winding of a power transformer. A multiple fan speed terminal arrangement having a slow speed terminal, a fast speed terminal, and a common terminal and temperature responsive fan switch terminals are provided. Additional terminals are provided for two pairs of normally closed furnace fan relay contacts and two pairs of normally open furnace fan relay contacts. The temperature responsive furnace fan switch and both pairs of normally closed furnace fan relay contacts are connected in series with the slow speed and common motor terminals across the line voltage conductors. Both pairs of normally open furnace fan relay contacts are connected in series with each other and with the fast speed and common motor terminals across the line voltage conductors. One contact of each of the four pairs of furnace relay contacts are connected to a common fan relay switch terminal. An electronic air cleaner is connected between the common fan relay switch terminal and the common motor terminal. The furnace fan relay solenoid is connected across the low voltage conductors in series with a suitable furnace fan switch terminal and various other low voltage controls are connected across the low voltage conductors.

BRIEF DESCRIPTION OF THE DRAWINGS

FIG. 1 is a perspective view of the control module for heating and cooling system in accordance with this invention; and FIG. 2 is a schematic electrical diagram illustrating in bold lines the terminals and prewired connections of a circuit board suitable for use in a system constructed in accordance with this invention.

DESCRIPTION OF A PREFERRED EMBODIMENT

This invention relates to a heating and cooling system which utilizes a furnace having a casing enclosing a fuel burner, a furnace fan, and a heat exchanger having a flue gas passage and a heating air passage. These components are not illustrated because they are well known in the art. A control system is provided to complete the heating and cooling system for controlling the furnace and various furnace accessories, such as the condensing unit of an air conditioning system, an electronic air cleaner, and a humidifier for adding moisture to the air discharged from the furnace fan, under certain conditions.

FIG. 1 is illustrative of a preferred physical embodiment of a suitable prewired control module 10 for the heating and cooling system. Preferably, a circuit or terminal board 11 is mounted within a housing 12 and provided with suitable line voltage terminals, relay sockets 29, 41, a single power transformer 13, and a low voltage terminal strip 14, which are accessible from one side of the circuit board. The other side of the circuit board (not shown) is prewired by printed circuit techniques to provide the desired control function when the various terminals are connected in the intended manner.

FIG. 2 illustrates the manner of prewiring of the control circuit in bold lines so that the desired program or sequence of operations is provided by the control system. The external connections made to the control module are shown in lighter lines. A pair of line voltage conductors 15 and 16 are disposed on circuit board 11 and connected to line terminals 17 and 18 respectively. Line voltage primary winding 19 of power transformer 13 is connected to terminals 20 which are electrically connected to the respective line voltage conductors. A pair of low voltage conductors 21 and 22 are disposed on circuit board 11 and low voltage secondary winding 23 of power transformer 13 is connected to terminals 24 which are electrically connected to the respective low voltage conductors to provide a source of low voltage thereto.

Three line voltage furnace fan terminals are provided on the circuit board for connecting a multispeed fan motor of a forced air furnace to the control circuit. The high speed terminal of the fan motor is connected to terminal 25; the low speed terminal of the fan motor is connected to the terminal 26 and the common terminal of the fan motor is connected to terminal 27, when the control module is installed in the heating and cooling system. In the event that it is desired to connect a single speed fan motor to the control system, terminals 25 and 26 are connected together and the fan motor is connected between terminals 25 and 27.

A fan motor relay socket 29 is mounted on terminal board 11 so that a suitable furnace fan control relay may be plugged into the circuit and replaced, if desired, for servicing. The fan motor relay has contacts for a first pair of normally closed fan motor relay switch contacts 30 and a second pair of normally closed fan motor relay switch contacts 31. The fan motor relay also has contacts for a first pair of normally open fan motor relay switch contacts 32 and a second pair of normally open fan motor relay switch contacts 33. One contact of each pair of the normally open and normally closed fan motor relay switch contacts are connected to each other inside the relay and to common fan motor relay terminals 34 and 35 on the fan motor relay socket, as shown in the drawing. The other contact of each pair is connected to the correspondingly numbered terminal on fan motor relay socket 29. A pair of terminals 36 are provided on the circuit board for a normally open, temperature responsive, fan switch, which is preferably mounted on the heat exchanger and closes in response to heating of the air passing through the furnace heat exchanger. Temperature responsive fan switch terminals 36 are consequently connected in series with normally closed fan motor relay switch contacts 30 and 31 to low speed fan motor terminal 26 and common fan motor terminal 27 across line voltage conductors 15 and 16. Normally open fan switch contacts 32 and 33 are connected in series with high speed fan motor terminal 25 and common terminal 27 across the line voltage conductors. Alternatively, switch 46 may be actuated by a time delay relay.

A terminal 37 is also provided on the circuit board which is electrically connected to line voltage conductor 16. Terminals 44 and 37 are therefore connected in series with the parallel combination of normally open switch terminals 32 with series connected switch terminals 30 and 36 across line voltage conductors 15 and 16. Terminals 44 and 37 are utilized for connecting a line voltage operated electric air cleaner to the heating and cooling system.

A pair of humidifier relay solenoid terminals 38 are provided on humidifier relay socket 41 which is mounted on terminal board 11 and a pair of line voltage humidifier terminals 42 are connected in parallel with terminals 38. Humidifier relay socket 41 also provides a pair of normally open humidifier relay switch terminals 50 for a pair of normally open humidifier relay switch contacts in the relay. A pair of low voltage humidistat terminals 52 and a pair of low voltage humidifier terminals 54 for a low voltage operated humidifier 55 are provided on circuit board 11. Terminals 50, 52 and 54 are connected in series with each other across low voltage conductors 21 and 22.

One of a pair of fan relay solenoid terminals 58 provided on circuit board 11 is connected to low voltage conductor 21. One of a pair of heating control valve terminals 60 mounted on circuit board 11 is also connected to low voltage conductor 21. One of a pair of condensing unit control terminals 62 mounted on circuit board 11 is likewise connected to low voltage conductor 21. A common thermostat terminal 65, a fan control thermostat terminal 66, a heating control thermostat terminal 67 and a cooling control thermostat terminal 68 are all mounted on circuit board 11 and connected, as shown, to the respective fan relay solenoid, heating valve control and condensing control terminals.

A thermostat 80 of a type which may be used to provide the heating and cooling functions of the system described, has a manual fan switch 70, which, in one position, completes a circuit between terminals 65 and 66 to manually energize fan relay solenoid 59 and in another position, completes a circuit between terminals 66 and 68 to automatically energize the fan relay solenoid and the condensing unit of the refrigeration system in accordance with the cooling demand sensed by the thermostat. Thermostat 80 is also provided with a manual heat-cool switch 74 which in the cooling position, shown in the drawing, completes the circuit through thermostat switch element 81 between terminals 68 and 65 thereby energizing the condensing unit of the refrigeration system when the thermostatic switch calls for cooling, or through cooling anticipator 85. Switch 74 in the heating position completes the circuit between terminals 77 which connects terminal 67 through heating anticipator 83 and thermostatic switch 81 to common terminal 65 for energizing the heating control valve connected between terminals 60 when thermostat switch 81 calls for heating.

In operation, terminals 17 and 18 of the control system are connected to a source of line voltage. The furnace fan relay is plugged into socket 29 and a two-speed furnace fan is connected to terminals 25, 26 and 27. The controls for gas valve 61 are connected across terminals 60 and thermostat 80 is connected to terminals 65, 66, 67 and 68. An electronic air cleaner is connected to terminals 44, 37. If only heating is required from the system, thermostat 80 may be of a simple type which does not utilize a cooling switch section and can even omit the fan switching section. Also, a single-speed motor may be connected between terminals 25 and 27 by shorting terminals 25 and 26 or by providing an internally wired fan relay switch using whatever terminals are desired to provide the particular control function required. In either event, the furnace fan is automatically energized on at least low speed whenever the temperature of the furnace heat exchanger reaches the point that temperature responsive fan switch closes.

A humidifier may be connected to the furnace in such a manner as to be operative whenever the temperature of the heat exchanger is sufficiently high to close temperature responsive furnace fan switch 46. If the humidifier is of the line voltage type employing line voltage operated controls, it is simply connected between terminals 42 in series with temperature responsive fan switch 46 across line voltage conductors 15 and 16, as shown in broken lines on the drawing. On the other hand, if it is desired to connect a humidifier having low voltage operated controls, in order to obtain the advantages of low voltage wiring, a humidifier relay is plugged into socket 41, the humidifier controls (humidistat) are connected across terminals 52, and humidifier 55 is connected across terminals 54 as shown in the drawing.

With the humidifier relay in place, whenever temperature responsive furnace fan switch 46 is closed, solenoid 40 of the humidifier relay is energized by line voltage and contacts 50 in the low voltage circuit close. When contacts 50 are closed, humidistat 56 connected across terminals 52 controls operation of humidifier 55 by making and breaking a series circuit which includes the low voltage humidifier across low voltage conductors 21 and 22.

When it is desired to provide cooling with the system, the controls of a condensing unit 63 of an air conditioning system are connected across terminals 62. Under these conditions, thermostatic switch 81 of thermostat 80 control the operation of condensing unit 63 and energize furnace fan relay solenoid 59, whenever cooling is required. When the furnace fan relay solenoid 59 is energized, the normally closed fan relay switches 30 and 31 are opened and the normally open fan relay switches connected across terminals 32 and 33 are closed, thereby energizing the high speed winding of the furnace fan.

When the electronic air cleaner is wired between terminals 44 and 37 of the circuit, it will be seen that the air cleaner is energized whenever the furnace fan is operated on either high or low speed and irrespective of whether the system is providing heating or cooling. On the other hand, the humidifier can only operate when heating is being provided, because it is only connected in series with temperature responsive switch 46.

A system in accordance with this invention provides a proper programing of the various furnace accessories such as the condensing unit of an air conditioning system, and electronic air cleaner, and a humidifier, while at the same time requiring a minimum number of parts and having a relatively fail-safe mode of operation enabling ease of field installation and servicing of initially or subsequently installed furnace accessories. In particular, the same prewired control circuit enables either initial or subsequent installation of a single speed or multiple speed motor, with or without humidification, and with or without air conditioning without modification of the circuit with an electronic air cleaner in a fail-safe manner without danger of burning out any of the accessories.

While a preferred embodiment of this invention has been described for purposes of illustration, it will be appreciated that the invention may otherwise be embodied within the scope of the following claims.

I claim:

1. A heating system having a control system adapted for operation with an air cleaner accessory unit and a multiple speed furnace fan including a furnace having a casing enclosing a fuel burner, a multiple speed furnace fan, a heat exchanger having a flue gas passage and a heated air passage, and a control system for controlling said furnace fan, furnace and air cleaner unit, said control system comprising:
   1. a power transformer having a line voltage primary winding and a low voltage secondary winding;
   2. a pair of line voltage conductors connected to the line voltage primary winding of said power transformer, said line voltage conductor having terminal means for connecting said conductors to a line voltage source;
   3. a pair of low voltage conductors connected to the low voltage secondary winding of said power transformer;
   4. motor terminal means for connecting a multiple speed furnace fan motor to said control circuit, said motor terminal means including a slow motor speed terminal, a high motor speed terminal, and a common motor terminal;
   5. thermostat terminal means for connecting a low voltage thermostat to said control circuit, said thermostat terminal means including a pair of heating switch terminals;
   6. fuel valve control terminal means for connecting a low voltage heating valve control in series with the heating switch terminals of said thermostat across said low voltage conductors for energizing the fuel burner of said furnace when said thermostat heating switch is closed;
   7. first fan switch terminal means for connecting a low voltage fan switch to said control circuit;
   8. second fan switch terminal means for connecting a second fan switch to said control circuit;
   9. fan relay terminal means for connecting a fan relay to said control circuit having a low voltage fan relay solenoid, said fan relay terminal means including terminals for two pairs of normally open relay switch contacts and two pairs of normally closed relay switch contacts, said fan relay solenoid terminals being connected in series with said first fan switch terminals across said low voltage conductors to energize said fan relay solenoid when said first fan switch contacts are closed, said second fan switch terminals and both pairs of said normally closed relay switch terminals being connected in series with each other and with the slow and common fan motor terminals across said line voltage conductors, whereby closure of said second fan switch contacts energizes the slow speed windings of said fan motor when said fan motor relay solenoid is deenergized, both pairs of said normally open relay switch terminals being connected in series with each other and with the fast and common motor terminals across said line voltage conductors, whereby energization of said fan relay solenoid by closure of said first fan switch closes said normally open relay switch contacts and opens said normally closed relay switch terminals to energize the fast speed winding of said fan motor, and conductor means electrically connecting the junction of said normally closed fan relay switch terminals and the junction of said normally open fan relay switch terminals together to form an electrically common relay switch terminal;
   10. air cleaner accessory terminal means for connecting an air cleaner unit to the control circuit across said electrically common switch terminal and said common motor terminal across said line voltage conductors, whereby the air cleaner is energized only whenever either the fast or slow speed windings of said motor are energized independently of the operation of the remainder of said control circuit;
   11. thermostat cooling switch terminal means for connecting a thermostat having a cooling control switch to said control circuit; and
   12. condensing unit control terminal means for connecting the low voltage controls of a condensing unit of a refrigeration system in series with said thermostat cooling switch terminals across said low voltage conductors for operating said refrigeration system and said furnace fan when said cooling switch and said first fan switch are closed.

2. A heating system as defined in claim 1 wherein said first fan switch fan terminals comprise thermostat fan switch terminal means for connecting furnace fan switch contacts associated with the thermostat in series with the fan relay solenoid across said low voltage conductors for energizing said furnace fan relay solenoid for operating said furnace fan at high speed when said thermostat cooling switch contacts are closed.

* * * * *